United States Patent [19]

Haas, Sr. et al.

[11] Patent Number: 4,602,590

[45] Date of Patent: Jul. 29, 1986

[54] SPREADING HEAD FOR A WAFER SHEET COATING MACHINE

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 682,560

[22] Filed: Dec. 17, 1984

[30] Foreign Application Priority Data

Dec. 23, 1983 [AT] Austria .................................. 4509/83

[51] Int. Cl.⁴ .............................................. B05L 1/02
[52] U.S. Cl. ........................................ 118/13; 118/262
[58] Field of Search ........................... 118/13, 259, 262

[56] References Cited

U.S. PATENT DOCUMENTS

| | | | |
|---|---|---|---|
| 2,620,767 | 12/1952 | Lehman | 118/13 |
| 2,622,555 | 12/1952 | Rudolph | 118/13 |
| 3,097,968 | 7/1963 | Schaefer | 118/262 X |
| 3,137,591 | 6/1964 | Schoutissen | 118/13 |
| 3,540,410 | 11/1970 | Osborne, Jr. et al. | 118/259 X |

Primary Examiner—John P. McIntosh
Attorney, Agent, or Firm—Kurt Kelman

[57] ABSTRACT

A spreading head is provided for a wafer sheet coating machine, which comprises a wafer sheet conveyor, which is optionally adapted to be lowered. The spreading head comprises a rotating spreading roller and a sizing device, which cooperates with said spreading roller to control the thickness of a layer of a spreadable composition as it is transferred by said spreading roller. The spreading roller and the sizing device define a lower boundary of a reservoir, which is adapted to hold said spreadable composition and which is laterally defined by platelike elements. To prevent an escape of spreadable composition from the reservoir along the end faces of the spreading roller, it is proposed to provide at least on each end face of the spreading roller a lateral covering, which extends from the reservoir for the spreadable composition along the periphery of the end face of the spreading roller continuously at least as far as to the point where the layer of the composition transferred is removed from the spreading roller. Said covering may be integral with the adjacent platelike element.

18 Claims, 2 Drawing Figures

SPREADING HEAD FOR A WAFER SHEET COATING MACHINE

BACKGROUND OF THE INVENTION

1. Field of the Invention

This invention relates to a spreading head for a wafer sheet coating machine, comprising a wafer sheet conveyor, which is optionally adapted to be lowered, a rotating spreading roller disposed above said conveyor, and sizing means, which are also disposed above said conveyor and adapted to cooperate with the spreading roller so as to control the thickness of the layer of spreadable composition which is being transferred by the spreading roller, said spreading roller and said sizing means defining a lower boundary of a reservoir, which is adapted to contain said spreadable composition and is laterally defined by platelike elements.

2. Description of the Prior Art

In a known spreading head for a wafer sheet coating machine, platelike elements are resiliently urged against the end faces of the spreading roller and are provided with upper and lower scraping bars which cooperate with the end faces of the roller and along the upper half of the roller, extend beyond the periphery of the roller and cause particles of the composition to be returned from the end face of the roller into the reservoir for the spreadable composition. A passage extending along the end face of the roller is defined by the upper and lower scraping bars and always provides a communication between the reservoir for the spreadable composition and the environment so that spreadable composition can escape through said passage during a prolonged standstill of the spreading roller.

SUMMARY OF THE INVENTION

It is an object of the invention to provide an improved spreading head of the type described first hereinbefore.

This is accomplished in accordance with the invention with a lateral covering on each end face of the spreading roller and extending from the reservoir for the spreadable composition along the periphery of the spreading roller continuously at least as far as to the point where the layer of spreadable composition is removed from the spreading roller. The covering may be integral with the adjacent platelike element, if desired. As a result, any escape of the spreadable composition from the reservoir for said composition at the end face of the spreading roller is prevented. Besides, the layer of spreadable composition on the spreading roller is laterally covered along the entire periphery of said roller by said covering so that the layer of spreadable composition cannot move laterally onto the end faces of the spreading roller as said layer is removed from the surface of the spreading roller by a knife or by a wafer sheet.

In accordance with a further feature of the invention, the lateral covering consists of a circular annular disc which is resiliently biased against the end face of the spreading roller and radially protrudes from the periphery of said roller. With that design, the layer of spreadable composition can be removed from the spreading roller by a knife in a space which is confined on three sides. In a spreading head comprising a sizing roller which is parallel to the spreading roller and is preferably spaced an adjustable distance from the spreading roller, it is contemplated by the invention that the lateral covering extends along the entire periphery of the end face of the sizing roller. In that case the sizing roller is exposed only adjacent to its shaft, which extends through the platelike element.

In accordance with a further feature of the invention, the lateral covering consists of a plate, which is resiliently biased against the end faces of the spreading roller and the sizing roller and radially protrudes beyond the peripheries of the sizing and spreading rollers and is formed with apertures receiving the shafts of the rollers.

In a spreading head comprising a container which is adapted to contain a spreadable composition and is sealed from the spreading roller and the sizing roller in the axial direction thereof by respective elastic sheets, which preferably tangentially lie on said rollers, it is a feature of the invention that the lateral coverings engaging the end faces of the spreading roller and of the sizing roller are in sealing contact with the outside surfaces of side walls of said container for the spreadable composition, which side walls laterally confine the reservoir for the spreadable composition, and said coverings seal the gaps between the peripheral surfaces of the spreading roller and the sizing roller and the lower edges of the side walls of the container for the spreadable composition.

DETAILED DESCRIPTION OF THE PREFERRED EMBODIMENT

Figure 1:
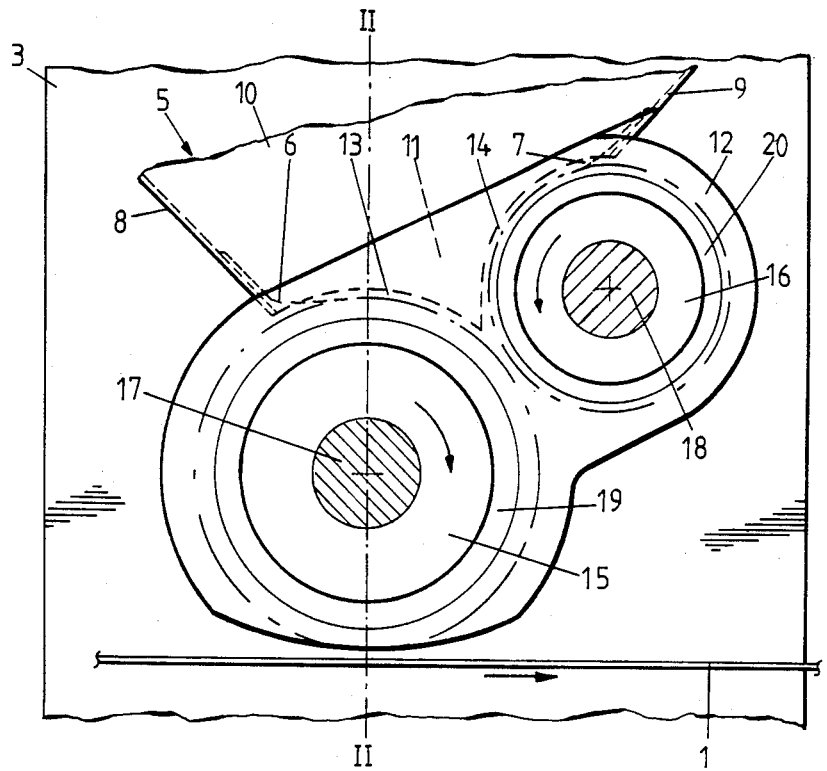
FIG. 1 is a diagrammatic side elevation showing a spreading head in accordance with the invention.
Figure 2:
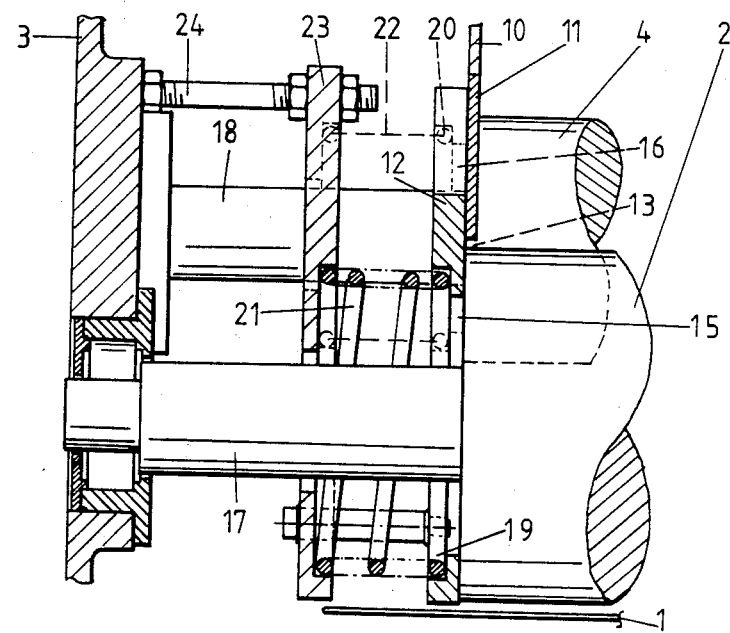
FIG. 2 is a diagrammatic sectional view taken on line II—II in FIG. 1.

An illustrative embodiment of the invention will now be described more in detail with reference to the drawing.

In a machine frame 3, a rotary spreading roller 2 is rotatably mounted on opposite sides of said frame. The spreading roller 2 is disposed above a wafer sheet conveyor 1, which consists of a belt conveyor and is optionally adapted to be lowered. A rotary sizing roller 4 is also rotatably mounted in the machine frame 3 and extends parallel to the spreading roller 2. The sizing roller 4 is adjustable as regards its spacing from the spreading roller 2. The two rollers are driven by drive means, not shown, and may be heatable, if desired.

The adjustment of the sizing roller 4 relative to the spreading roller determines the width of the gap between said two rollers and the thickness of the layer of spreadable composition on the spreading roller 2. The spreadable composition is taken from a reservoir for the spreadable composition and is supplied to said reservoir from a container 5, which is disposed above said reservoir. The lower boundary of the reservoir for the spreadable composition is defined by the spreading roller 2 and the sizing roller 4. The reservoir for the spreadable composition is sealed along lines extending in the axial direction of the two rollers by elastic sheets 6, 7 which are secured to the inside surfaces of transverse walls 8, 9 of the container 5 and are in tangential contact with the respective roller. The reservoir for the spreadable composition is defined on its sides by the lower end portions 10 of the side walls 11 of the container 5 and by lateral coverings 12. The end portions 10 of the side walls 11 of the container 5 extend almost to the two rollers and define gaps 13, 14 with the respective rollers.

The two coverings 12 are in sealing contact with the end faces of the sizing roller 4 and of the spreading roller 2 and with the end portions 10 of the side walls 11 of the container 5 and seal the spaces 13, 14 between the lower edges of the side walls 11 and the peripheral surfaces of the two rollers. The coverings 12 are provided with circular openings 15, 16 for the shafts 17 and 18 of the spreading roller and the sizing roller, respectively. Each of the circular openings 15, 16 is adjoined by a respective circular groove 19, 20, which constitutes an abutment for a respective compression spring 21, 22, which is coaxial with the respective roller shaft 17, 18.

The two compression springs 21, 22 bear at the other ends on a backing plate 23, which is secured by posts 24 to the machine frame 3.

The coverings 12 protrude radially beyond the sizing roller 4 and the spreading roller 2. Only near the point where the layer of spreadable composition is removed from the spreading roller do the coverings protrude only slightly from the periphery of the spreading roller 2.

What is claimed is:

1. A spreading head for a wafer sheet coating machine comprising a wafer sheet conveyor arranged to convey the wafer sheet to the spreading head, and the spreading head being arranged to spread a spreadable composition over the wafer sheet conveyed thereto, the spreading head comprising
   (a) a rotary spreading roller rotatable about an axis and having two end faces extending perpendicularly to the axis, the spreading roller being disposed above the conveyor and having a circumference with a nadir at which the spreadable composition is removed from the spreading roller and spread in a layer over the wafer sheet on the conveyor,
   (b) a sizing means cooperating with the spreading roller for controlling the thickness of the spreadable composition on the spreading roller,
   (c) an open-bottomed reservoir for the spreadable composition disposed above the spreading roller, the open bottom of the reservoir being defined by the spreading roller and the sizing means for delivering the spreading composition thereto, and the reservoir having
     (1) side walls extending perpendicularly to the spreading roller axis and
     (2) transverse walls extending parallel thereto, and
   (d) a respective covering in contact with a respective one of the end faces of the spreading roller, the coverings
     (1) extending over the entire circumference of the spreading roller and radially projecting therebeyond and at least to the nadir thereof, and
     (2) sealing the spreading roller end faces from the spreading composition in the reservoir and on the spreading roller.

2. The spreading head of claim 1, wherein each one of the coverings is an annular disc resiliently biased against a respective one of the spreading roller end faces in contact therewith.

3. The spreading head of claim 1, wherein the sizing means comprises a rotary sizing roller having a circumference and being rotatable about an axis spaced from, and parallel to, the axis of the spreading roller, the sizing roller having two end faces extending perpendicularly to the axes, the coverings also extending over the entire circumference of the sizing roller and radially projecting therebeyond, and the coverings also being in contact with the sizing roller end faces and sealing the sizing roller end faces from the spreading composition in the reservoir and on the sizing roller.

4. The spreading head of claim 3, wherein the coverings are resiliently biased against the spreading and sizing roller end faces.

5. The spreading head of claim 3, wherein the spacing between the spreading and sizing rollers is adjustable.

6. The spreading head of claim 1, wherein the spreading and sizing rollers have shafts protruding from the end faces of the rollers, and the coverings are plates defining openings for the shafts, the plates being in contact with the roller end faces and projecting radially therebeyond.

7. The spreading head of claim 1, wherein the wafer sheet conveyor is adapted to be lowered relative to the spreading head.

8. The spreading head of claim 1, wherein the coverings are integral with the side wall of the reservoir.

9. The spreading head of claim 1, wherein the coverings are resiliently biased against the end faces of the spreading roller.

10. The spreading head of claim 1, wherein the coverings having sealing surfaces in contact with the roller end faces and are covered with a layer of a lubricant.

11. A spreading head for a wafer sheet coating machine comprising a wafer sheet conveyor arranged to convey the wafer sheet to the spreading head, and the spreading head being arranged to spread a spreadable composition over the wafer sheet conveyed thereto, the spreading head comprising
    (a) a rotary spreading roller rotatable about an axis and having two end faces extending perpendicularly to the axis, the spreading roller being disposed above the conveyor and having a circumference with a nadir at which the spreadable composition is removed from the spreading roller and spread in a layer over the wafer sheet on the conveyor,
    (b) a rotary sizing roller cooperating with the spreading roller for controlling the thickness of the spreadable composition on the spreading roller, the sizing roller having a circumference and being rotatable about an axis spaced from, and parallel to, the axis of the spreading roller, the sizing roller having two end faces extending perpendicularly to the axes,
    (c) an open-bottomed reservoir for the spreadable composition disposed above the spreading roller, the open bottom of the reservoir being defined by the spreading roller and the sizing roller for delivering the spreading composition thereto, and the reservoir having
      (1) side walls extending perpendicularly to the spreading roller axis and having lower end portions, the lower side wall end portions defining gaps with the circumferences of the spreading and sizing rollers,
      (2) transverse walls extending parallel thereto, and
      (3) elastic sheets sealing the transverse walls from the spreading and sizing rollers, and
    (d) a respective covering in contact with a respective one of the end faces of the spreading and sizing rollers, the coverings
      (1) extending over the entire circumferences of the spreading and sizing rollers and radially projecting therebeyond and at least to the nadir of the spreading roller, and (2) sealing the spreading and sizing roller end faces from the spreading composition in the reservoir and on the spreading roller.

12. The spreading head of claim 11, wherein the coverings are resiliently biased against the spreading and sizing roller end faces.

13. The spreading head of claim 11, wherein the spacing between the spreading and sizing rollers is adjustable.

14. The spreading head of claim 11, wherein the spreading and sizing rollers having shafts protruding from the end faces of the rollers, and the coverings are plates defining openings for the shafts, the plates being in contact with the roller end faces and projecting radially therebeyond.

15. The spreading head of claim 11, wherein the wafer sheet conveyor is adapted to be lowered relative to the spreading head.

16. The spreading head of claim 11, wherein the coverings are integral with the side wall of the reservoir.

17. The spreading head of claim 11, wherein the coverings are resiliently biased against the end faces of the spreading roller.

18. The spreading head of claim 11, wherein the coverings have sealing surfaces in contact with the roller end faces and are covered with a layer of a lubricant.

* * * * *